(12) United States Patent
Ayhan

(10) Patent No.: US 12,743,102 B2
(45) Date of Patent: Sep. 22, 2026

(54) AIRCRAFT FLIGHT PATH NOISE REDUCTION

(71) Applicant: The Boeing Company, Arlington, VA (US)

(72) Inventor: Samet Ayhan, Fairfax, VA (US)

(73) Assignee: The Boeing Company, Arlington, VA (US)

( * ) Notice: Subject to any disclaimer, the term of this patent is extended or adjusted under 35 U.S.C. 154(b) by 96 days.

(21) Appl. No.: 18/627,349

(22) Filed: Apr. 4, 2024

(65) Prior Publication Data

US 2025/0165007 A1 May 22, 2025

Related U.S. Application Data

(60) Provisional application No. 63/600,990, filed on Nov. 20, 2023.

(51) Int. Cl.

*G05D 1/644* (2024.01)
*G05D 1/229* (2024.01)
*G05D 1/243* (2024.01)
*G05D 1/46* (2024.01)

(52) U.S. Cl.

CPC ........... *G05D 1/645* (2024.01); *G05D 1/2295* (2024.01); *G05D 1/243* (2024.01); *G05D 1/46* (2024.01)

(58) Field of Classification Search

None

See application file for complete search history.

(56) References Cited

U.S. PATENT DOCUMENTS

| | | | | |
|---|---|---|---|---|
| 11,157,867 | B1 * | 10/2021 | Jordan | G05D 1/104 |
| 2011/0046818 | A1 * | 2/2011 | Herkes | G08G 5/20 701/3 |
| 2018/0286372 | A1 * | 10/2018 | Beckman | G10K 11/17853 |

(Continued)

FOREIGN PATENT DOCUMENTS

| | | | | |
|---|---|---|---|---|
| CN | 113670309 A | * 11/2021 | | G06F 17/18 |
| CN | 116929358 A | 10/2023 | | |
| EP | 3983753 B1 | 8/2023 | | |

OTHER PUBLICATIONS

ISA European Patent Office, International Search Report and Written Opinion Issued in Application No. PCT/US2024/056012, Feb. 24, 2025, WIPO, 16 pages.

(Continued)

*Primary Examiner* — Davin Seol

(74) *Attorney, Agent, or Firm* — Alleman Hall LLP

(57) ABSTRACT

A method for aircraft flight path generation includes, at a computing system, receiving, for a plurality of waypoints in a geographic area, predicted aircraft noise levels for an aircraft at each waypoint of the plurality of waypoints, the predicted aircraft noise levels predicted based at least in part on a plurality of flight parameters for the aircraft. The predicted aircraft noise levels are input to a flight path prediction system configured to generate a candidate flight path for the aircraft through the geographic area based at least in part on the predicted aircraft noise levels. The candidate flight path is output from the flight path prediction system, wherein the candidate flight path is predicted to result in less ground-level noise when followed by the aircraft as compared to an alternate flight path through the geographic area.

20 Claims, 9 Drawing Sheets

(56) References Cited

U.S. PATENT DOCUMENTS

| | | | | |
|---|---|---|---|---|
| 2020/0256686 | A1* | 8/2020 | Pheiffer | G05D 1/08 |
| 2022/0108621 | A1* | 4/2022 | Li | G05D 1/042 |
| 2022/0392357 | A1 | 12/2022 | Bruce et al. | |
| 2024/0062660 | A1* | 2/2024 | Villa | G05D 1/0202 |

OTHER PUBLICATIONS

He, X. et al., "A route network planning method for urban air delivery," Transportation Research Part E: Logistics and Transportation Review, vol. 166, Sep. 9, 2022, 25 pages.

* cited by examiner

AIRCRAFT FLIGHT PATH NOISE REDUCTION

CROSS REFERENCE TO RELATED APPLICATIONS

This application claims priority to U.S. Provisional Patent Application No. 63/600,990, filed Nov. 20, 2023, the entirety of which is hereby incorporated herein by reference for all purposes.

FIELD

This disclosure is in the technical field of reducing noise experienced on the ground due to overhead aircraft flight.

BACKGROUND

Aircraft arriving at airports and aircraft departing from airports produce noise levels that can disturb communities surrounding the airport. Significant decreases have been made in the noise caused by aircraft in the past few decades. However, improvements in navigation techniques have resulted in aircraft overflying some communities with increased frequency. This change has resulted in complaints from communities at locations on departure and arrival flight tracks.

In response to these complaints, many countries have enacted regulations to control aircraft noise. For example, the Federal Aviation Administration (FAA) regulates the maximum amount of noise that an individual civil aircraft can produce during takeoff and landing and near airports. Air navigation service providers (ANSPs) across the world are making efforts to enforce noise-reduced arrival and departure procedures and penalizing airlines for their flights that produce noise above mandated thresholds.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

A method for aircraft flight path generation includes, at a computing system, receiving, for a plurality of waypoints in a geographic area, predicted aircraft noise levels for an aircraft at each waypoint of the plurality of waypoints, the predicted aircraft noise levels predicted based at least in part on a plurality of flight parameters for the aircraft. The predicted aircraft noise levels are input to a flight path prediction system configured to generate a candidate flight path for the aircraft through the geographic area based at least in part on the predicted aircraft noise levels. The candidate flight path is output from the flight path prediction system, wherein the candidate flight path is predicted to result in less ground-level noise when followed by the aircraft as compared to an alternate flight path through the geographic area.

The features, functions, and advantages that have been discussed can be achieved independently in various embodiments or can be combined in yet other embodiments, further details of which can be seen with reference to the following description and drawings.

DETAILED DESCRIPTION

Figures 1A, 1B:
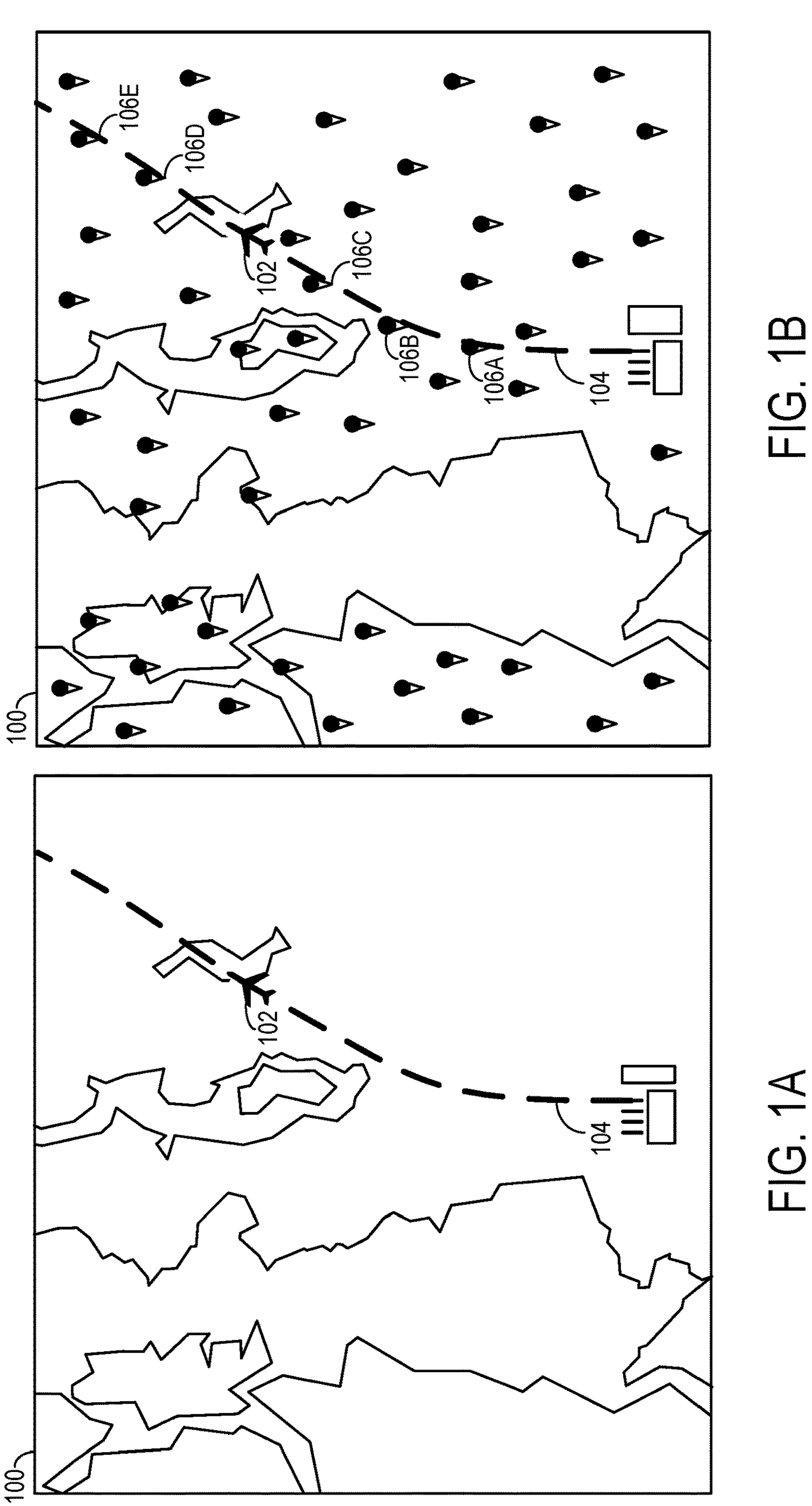
FIGS. 1A and 1B schematically show an aerial view of an example geographic area, including a plurality of waypoints at which aircraft noise levels are predicted.

The present disclosure contemplates a system for generating flightpaths for an aircraft through a geographic area to reduce cumulative aircraft noise. Referring first to FIG. 1A, a map of a geographic area 100 is shown. An aircraft 102 is flying through the geographic area along a flight path 104. The operation of the aircraft produces noise that can be audible and potentially disruptive on the ground. The amount of noise experienced at any given point along the ground depends on the specific flight path taken by the aircraft, with some potential flight paths producing a greater level of perceptible noise than others.

Accordingly, the flight path generation techniques described herein can be used to generate flight paths for aircraft that reduce disturbance in surrounding communities and enable aircraft operators to improve operations and reduce the risk of penalties for noise above mandated thresholds. The system is applicable to addressing any appropriate metric associated with noise, such as maximum sound pressure level (Lamax), sound exposure level (SEL), etc. Also, while specifically discussed in the context of arrivals/departures at airports, it will be appreciated that the present discussion is applicable to any setting in which proximity of aircraft creates noise levels that vary based on the path of the aircraft relative to where the noise is experienced.

As will be described in more detail below, flight paths may be generated based on predicted noise levels at a plurality of different waypoints distributed throughout the geographic area—e.g., an assessment of the noise level that would occur if the aircraft's path were to go through or near a given waypoint. Using predicted noise in conjunction with other considerations, waypoints may be connected stepwise in sequence to create the flight path to optimally reduce noise. "Optimal," as used herein, is not intended to require that the selected waypoints produce the lowest possible noise—other factors can influence the path selection. Thus, "optimal" will often refer to the least noisy path that satisfies a relevant set of constraints. In other words, "optimal" can generally refer to a reduced level of noise in relation to other path options.

FIG. 1B again shows geographic area 100, including a plurality of waypoints indicated by markers distributed throughout the geographic area. Five of these waypoints are labeled as waypoints 106A-E and fall along flight path 104 of aircraft 102. These waypoints indicate positions at which aircraft noise levels can be predicted. For instance, ground-based sound-sensing equipment can be used to measure noise produced by various different aircraft during a number of previous flights. Based on these ground truth measurements, it is possible to predict the amount of noise that would be caused by a given aircraft while passing through different waypoints in the area.

In some examples, the techniques described herein may be applied to airspace regions associated with major airports—e.g., locations near urban centers with significant air traffic. However, it will be understood that the techniques described herein can be applied to geographic areas of any suitable size and location. Any suitable number of different waypoints may be defined within a given geographic area, and such waypoints may have any suitable regular or irregular distribution. In some examples, the waypoints have a three-dimensional distribution throughout the geographic area. For instance, in some examples, waypoints are distributed throughout the airspace of the geographic area. In some examples, the geographic area may include one or more ground-level waypoints—e.g., disposed at or near an airport runway. Furthermore, any suitable devices or sensors may be distributed throughout the geographic area for measuring ground-level noise.

Figure 2:
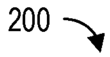
FIG. 2 illustrates an example method for aircraft flight path generation.
Figure 2:
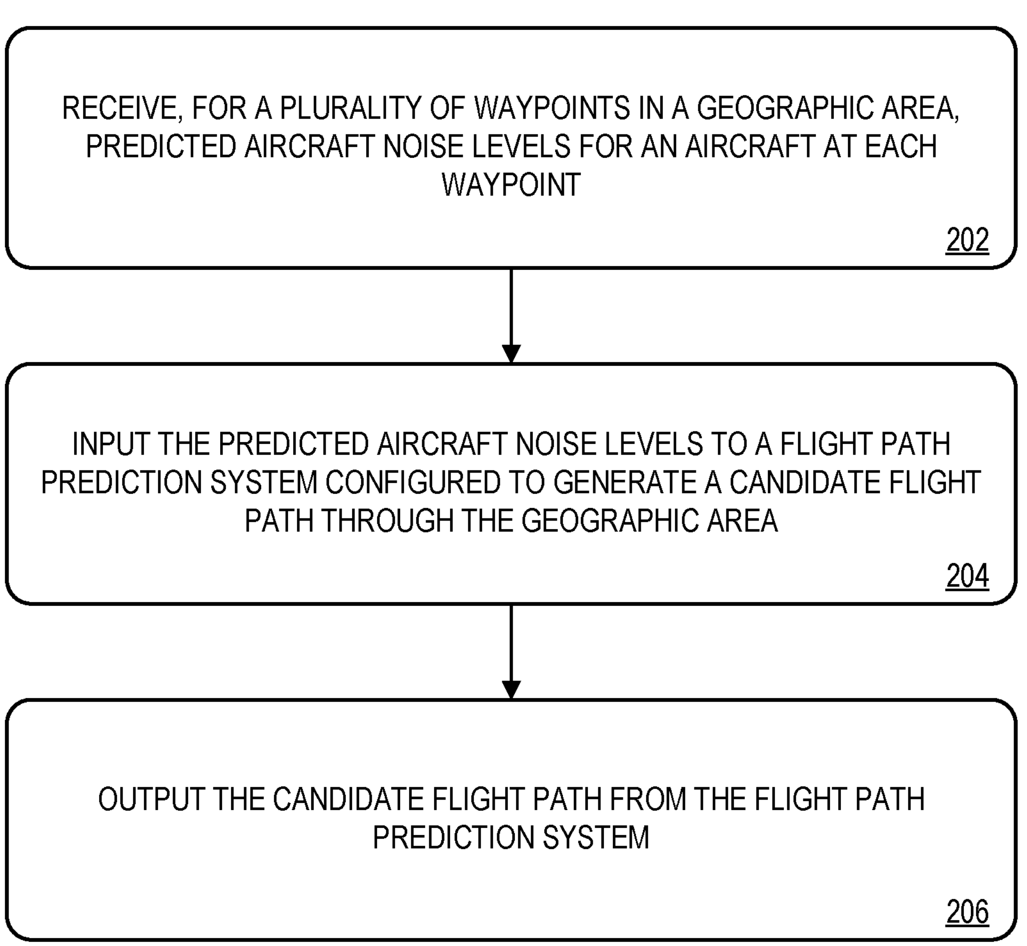

In any case, ground-truth noise levels measured by suitable ground-based sensing equipment can be used to predict noise levels at different waypoints for a potential future flight path passing through the waypoints. Furthermore, such predicted noise levels can be used to generate a candidate flight path for an aircraft that reduces perceptible noise caused by the aircraft. FIG. 2 illustrates an example method 200 for aircraft flight path generation. Steps of method 200 may be initiated, terminated, and/or repeated at any suitable time and in response to any suitable condition. Method 200 may be implemented by any suitable computing system of one or more computing devices. Any computing device implementing steps of method 200 may have any suitable capabilities, hardware configuration, and form factor. In some examples, method 200 may be implemented as computing system 800 described below with respect to FIG. 8.

At 202, method 200 includes receiving, for a plurality of waypoints in a geographic area, predicted aircraft noise levels for an aircraft at each waypoint of the plurality of waypoints. The predicted aircraft noise levels are predicted based at least on a plurality of flight parameters for the aircraft.

Figure 3:
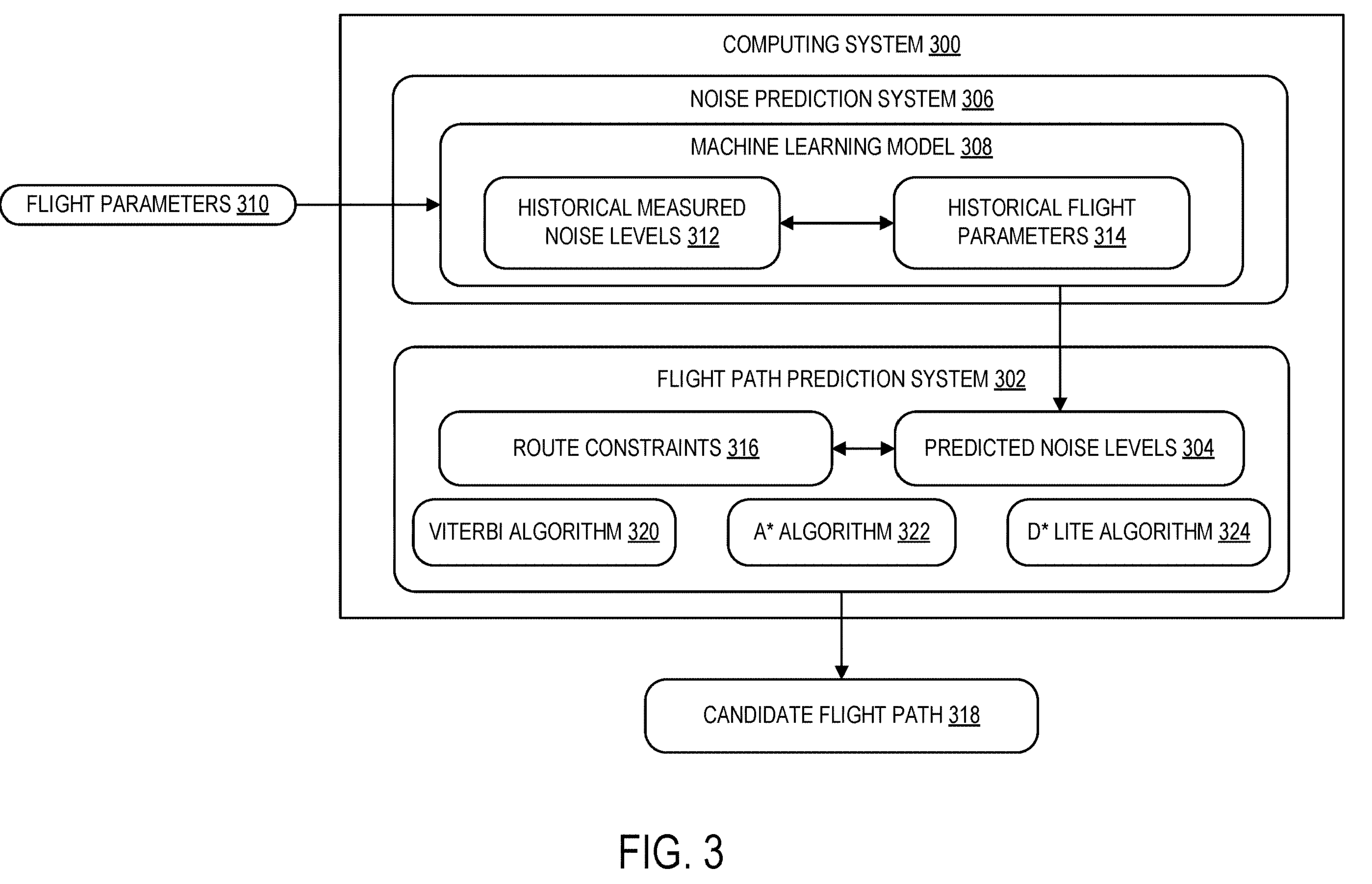
FIG. 3 schematically shows an example computing system implementing a flight path prediction system.

Method 200 is described in more detail with respect to FIG. 3. Specifically, FIG. 3 schematically shows an example computing system 300. As discussed above, computing system 300 may have any suitable configuration and capabilities. In some examples, aspects of computing system 300 may be distributed between two or more different computing devices. In some examples, computing system 300 is implemented as computing system 800 described below with respect to FIG. 8.

In FIG. 3, computing system 300 implements a flight path prediction system 302. The flight path prediction system has received a set of predicted noise levels 304 corresponding to a plurality of different waypoints within a geographic area. In this example, the predicted noise levels are predicted by a noise prediction system 306 of the computing system. The noise prediction system implements a machine learning model 308 configured to predict the predicted noise levels based at least in part on a set of flight parameters 310 received by the computing system.

The flight path prediction system 302 and noise prediction system 306 may each be implemented as any suitable combination of computer software, hardware, and/or firmware components. In some examples, the flight path prediction system and noise prediction system are separate software applications running on the same computing device, or running on different computing devices that are communicatively coupled with one another. As will be described in more detail below, each of the flight path prediction system and noise prediction system may implement any suitable models and/or algorithms to generate output data based on suitable input data. In some examples, suitable machine learning (ML) and/or artificial intelligence (AI) technologies may be used.

For instance, machine learning model 308 is used to predict the predicted noise levels 304 based at least in part on the set of flight parameters 310. In some cases, the noise prediction system may include two or more different machine learning models for predicting noise levels—e.g., corresponding to different geographic areas (e.g., different airport regions), different aircraft types, different types of flight paths (e.g., arrival or departure), etc. Any suitable underlying ML technology may be used. As examples, ML models can be selected from at least one of one of a linear machine learning model, a nonlinear machine learning model, an ensemble machine learning model system, a neural network model, a transformer model, and/or other suitable type of machine learning model.

Figure 4:
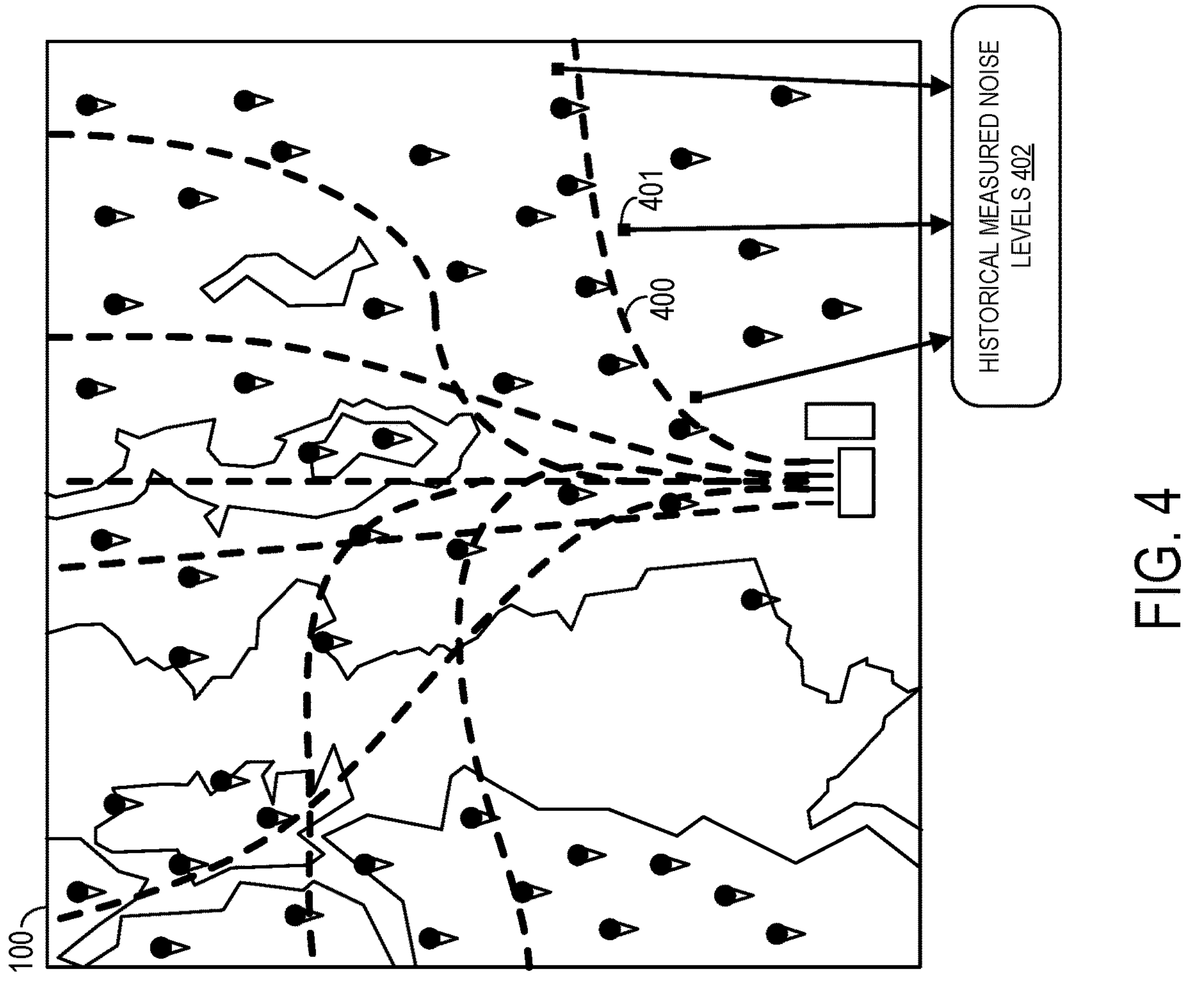
FIG. 4 schematically illustrates collection of historical measured noise levels.

Furthermore, machine learning models may be trained in any suitable way. In the example of FIG. 3, the predicted noise levels are predicted based at least in part on a plurality of historical measured noise levels 312 measured throughout the geographic area. The historical noise levels, while measured by ground-based equipment, are useable to predict the amount of noise experienced at the various different waypoints. This is schematically illustrated with respect to FIG. 4, again showing geographic area 100 and a plurality of waypoints distributed throughout the area. In this example, a plurality of prior flight paths are shown throughout the geographic area, one of which is labeled as prior flight path 400. During these prior aircraft flights, sound levels are measured at ground-based sensing equipment. The positions of several ground sensors (such as microphones) are labeled using black squares, including sensor position 401. Noise levels measured by these ground sensors are output as historical measured noise levels 402. It will be understood that a plurality of different ground sensors may be distributed throughout the geographic area, and used to measure noise levels experienced at the ground while aircraft flights are ongoing.

Returning to FIG. 3, the historical measured noise levels are associated with a plurality of historical flight parameters 314 corresponding to the plurality of prior aircraft flights. In other words, in this example, the predicted aircraft noise levels are predicted by a machine learning model trained based at least in part on the historical measured noise levels and historical flight parameters for the plurality of prior aircraft flights. In this manner, for a given set of flight parameters corresponding to an upcoming aircraft flight, the noise prediction system can be used to predict noise levels at each of the plurality of waypoints for the upcoming flight, should the flight pass through or near the waypoint.

It will be understood that "flight parameters" can include a wide variety of different types of information pertaining to a particular aircraft and/or current environmental conditions.

As non-limiting examples, flight parameters can include the aircraft type (e.g., manufacturer, model, size, aerodynamic characteristics), engine type (e.g., turbojet, turbofan, turboprop), engine thrust setting (e.g., takeoff, climb, cruise, approach, and landing may each have different thrust settings that produce different levels of noise), aircraft speed, altitude, time of day, weight and load, atmospheric conditions (e.g., weather conditions, temperature, humidity, air pressure, wind speed, wind direction), ground terrain (e.g., urban areas, bodies of water, forests), etc. Flight parameters 310 may include any or all of such information for an upcoming aircraft flight, while the historical flight parameters may include any or all of such information for each of a plurality of prior aircraft flights. Furthermore, flight parameters may include any additional or alternative information to the examples discussed herein.

It will be understood that the flight parameters may be received from any suitable source. For instance, flight parameters may be loaded from a database, received over a computer network, loaded from a removable storage device, manually entered by a human worker, etc. Some of the flight parameters may be collected at devices or sensors located at the waypoints distributed throughout the geographic area, at devices or sensors located away from the waypoints, and/or from any other suitable source.

In any case, based on the set of flight parameters, the noise prediction system outputs the set of predicted noise levels for the plurality of waypoints. These noise predictions may be made with any suitable level of granularity, to account for aircraft type, speed, altitude, atmospheric conditions, or any other appropriate parameter. Cumulative noise levels can then be predicted for potential flight paths constructed from multiple waypoints.

To this end, returning briefly to FIG. 2, at 204, method 200 includes inputting the predicted aircraft noise levels to a flight path prediction system configured to generate a candidate flight path for the aircraft through the geographic area. The candidate flight path may be generated based at least in part on the predicted aircraft noise levels and a plurality of route constraints. In the example of FIG. 3, the flight path prediction system generates a candidate flight path 318 based on the predicted noise levels 304 and a plurality of route constraints 316.

In general, the flight path prediction system generates a candidate flight path that is predicted to result in less ground-level noise when followed by the aircraft as compared to an alternate flight path through the geographic region. In other words, the candidate flight path generated by the flight path prediction system is predicted to cause less perceptible ground-level noise as compared to a naïve flight path generated without respect to noise reduction. In some examples, the flight path prediction system aims to predict a flight path that minimizes the amount of ground-level noise—e.g., the least noisy possible flight path through the geographic area. Alternatively, in some examples, the flight path prediction system aims to generate flight paths predicted to cause an amount of ground-level noise at a ground location in the geographic area that is less than a predefined noise target—e.g., a maximum sound level imposed by applicable regulations-without necessarily generating the least noisy possible flight path.

The plurality of route constraints include any suitable information pertaining to the ability of an aircraft to move throughout the geographic area—e.g., any constraints on the waypoints within the geographic area that the aircraft can fly through or near. As non-limiting examples, the plurality of route constraints may include one or more of a turning radius of the aircraft, coordinates of restricted airspace within the geographic area (e.g., no-fly zones, special use airspace), weather conditions in the geographic area (e.g., locations affected by convective weather), and departure and arrival procedures applying to the geographic area (e.g., standard instrument departure routes (SIDs) and/or standard arrival routes (STARs)). The route constraints may be received from any suitable source—e.g., loaded from one or more databases, received over suitable computer networks (e.g., accessed via an API over the internet), manually entered by human workers, etc. Furthermore, in some examples, one or more route constraints may dynamically update over time. For instance, as weather conditions change, weather-related route constraints may be dynamically transmitted to the flight path prediction system and used in generating future candidate flight paths.

Various approaches may be employed to select a candidate flight path to optimally reduce noise impacts. In some examples, generating the candidate flight path includes a grid-based approach, which involves overlaying a virtual grid on the geographic area such that, for a grid cell of the virtual grid, a grid-relative predicted noise level of the grid cell is interpolated from one or more predicted aircraft noise levels of one or more waypoints falling within the grid cell. The candidate flight path may then be generated as a plurality of cell-to-cell segments between grid cells of the virtual grid, wherein each cell-to-cell segment is selected based at least in part on grid-relative predicted noise levels of grid cells connected by the cell-to-cell segment. This may be done, for instance, using a dynamic grid-based Viterbi algorithm to generate the candidate flight path. In the example of FIG. 3, flight path prediction system implements a Viterbi algorithm 320 that may be used in generating the candidate flight path.

Figure 5:
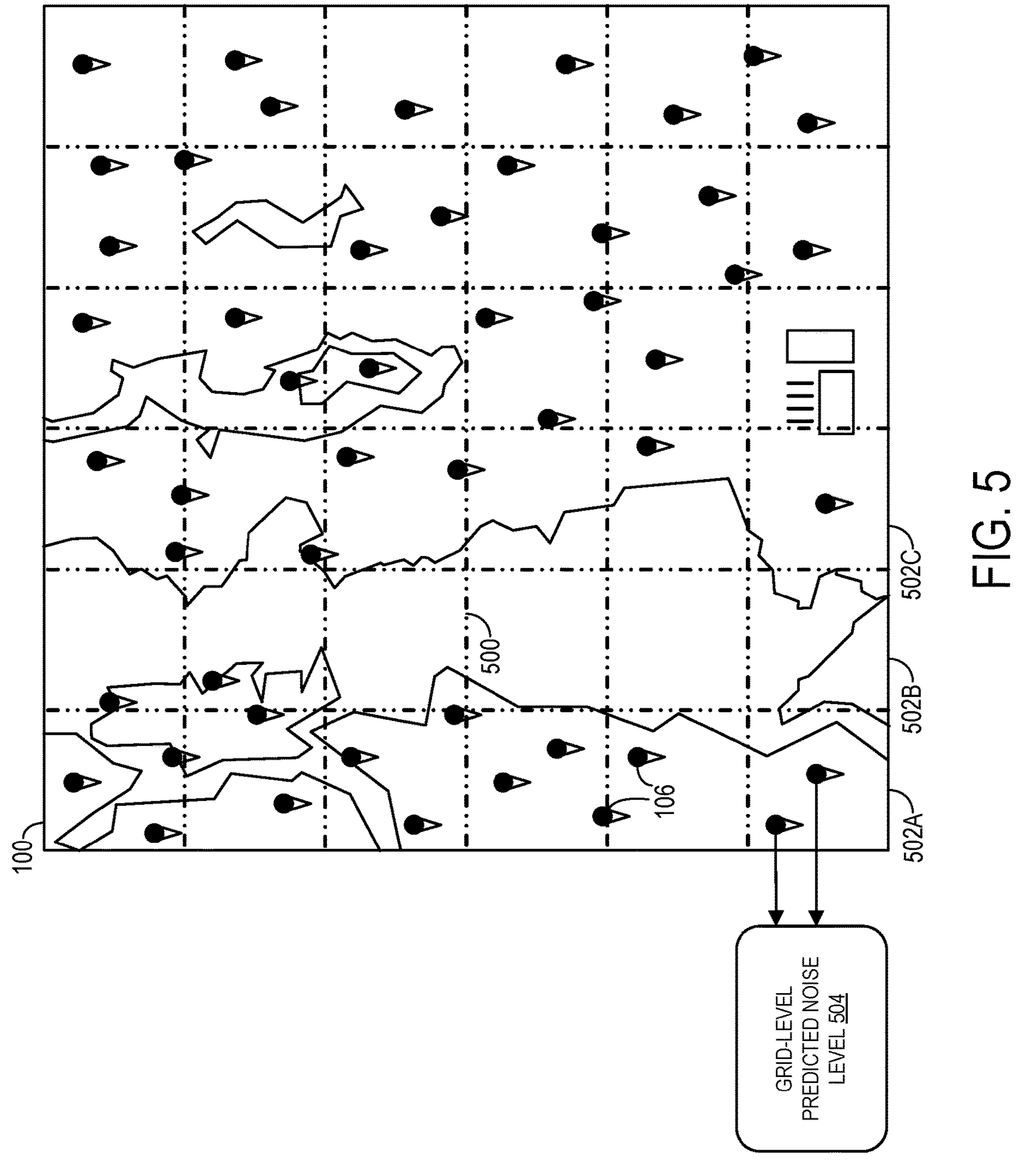
FIG. 5 schematically shows a virtual grid overlaid on a geographic area, where the size of the virtual grid is configurable.

FIG. 5 depicts an example grid-based approach, in which a virtual grid 500 is overlaid on the geographic area 100. The virtual grid includes a plurality of grid cells, three of which are labeled as grid cells 502A, 502B, and 502C. It will be understood that the size of the virtual grid in FIG. 5 relative to the geographic area 100 is non-limiting. In general, each cell of the virtual grid may be sized such that the geographic area is represented by two or more grid cells. In some examples, the virtual grid may include dozens, hundreds, or thousands of grid cells representing different portions of the geographic area.

At each location on the grid, the predicted noise values of waypoints falling within each grid cell are used to compute a noise value for the grid cell. In FIG. 5, two different waypoints fall within grid cell 502A. Predicted noise values for these waypoints are interpolated to give a grid-level predicted noise level 504 for the grid cell. This may be repeated for any or all of the grid cells, to give grid-level predicted nose levels for any or all of the grid cells. In some examples, the virtual grid may include one or more grid cells that include no waypoints for which noise levels are measured, such as cells representing remote areas, bodies of water, etc. In such cases, any suitable noise value may be predicted for the empty grid cells. For instance, an average noise level may be used, interpolated values from neighboring cells may be used, a value of zero may be used, etc.

Figures 6A, 6B, 6C:
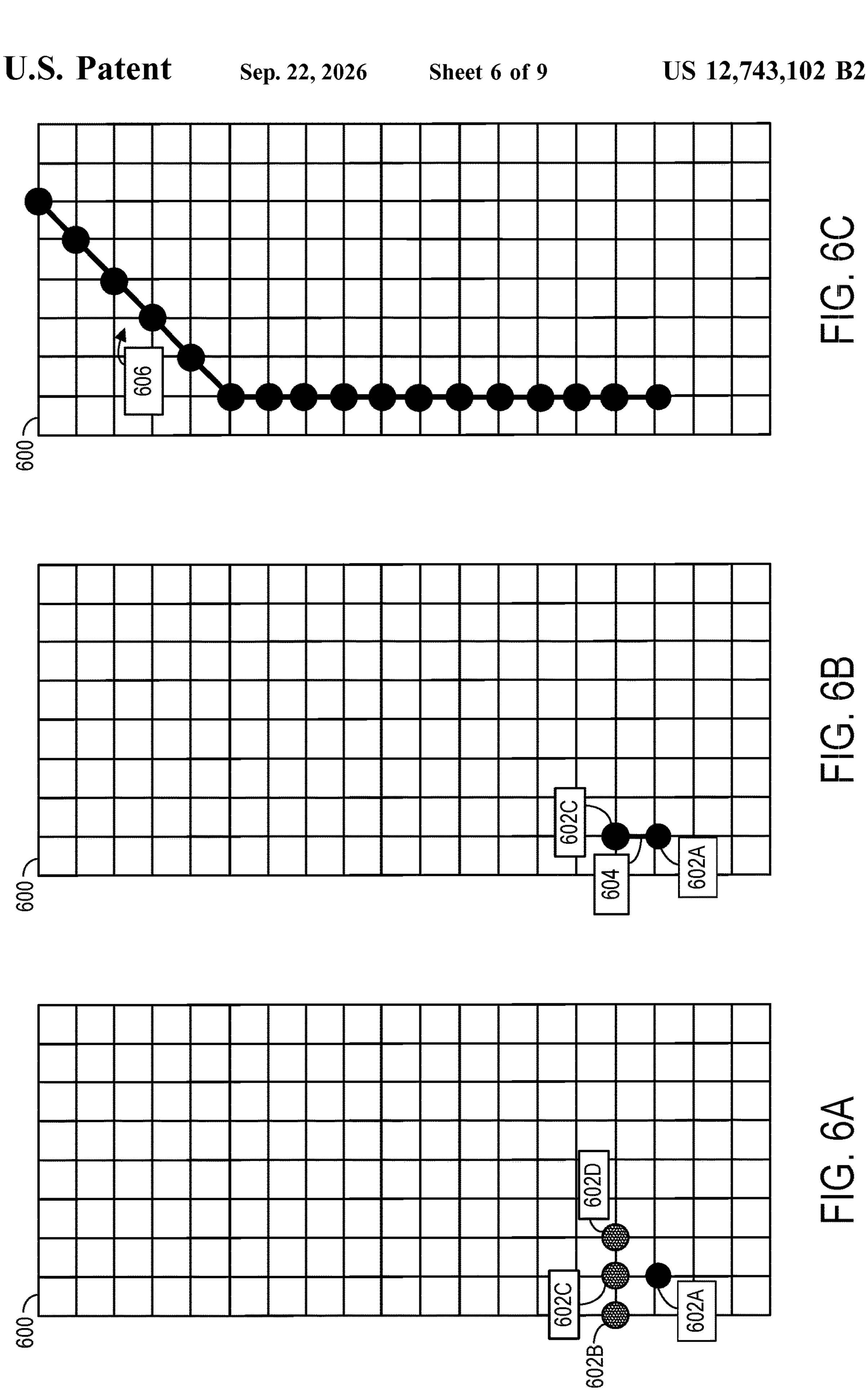
FIGS. 6A-C illustrate generating a flight path by connecting a plurality of cell-to-cell segments between grid cells of a virtual grid.

FIGS. 6A-6C illustrate an example grid-based approach to flight path generation. Specifically, FIGS. 6A-6C show an example virtual grid 600, which may be overlaid on a geographic area as discussed above. In FIG. 6A, a particular grid location 602A has been identified as the starting point of a flight path. This may, for instance, correspond to the location of an airport from which the aircraft will depart. In general, the starting point of the flight path corresponds to the grid location at which the aircraft begins flying through the geographic region. This may be a grid location corresponding to an airport, an airstrip, or another location from which an aircraft takes off (e.g., a body of water in the case of a seaplane), or a location from which a flying aircraft is expected to enter the geographic area from a neighboring area. In the example of FIGS. 6A-C, the grid locations are shown as intersections between different grid cells, although this is non-limiting. Rather, in some examples, flight paths may be generated based on the center of each grid cell, or another suitable position within each grid cell, or positions falling on the borders between adjacent/orthogonal grid cells.

In FIG. 6A, additional grid locations 602B, 602C, and 602D are candidates for extending the flight path. In this example, there are three candidate extensions, although it will be understood that this is non-limiting. In other examples, any suitable number of different grid locations may be considered for extending the flight path, depending on the intended direction of the flight and any applicable route constraints. The set of candidate flight path extensions that are available to be selected from may be determined using any suitable criteria or constraints, including eligible flight paths in the airspace, whether it is practical or feasible for the aircraft to maneuver to a particular waypoint, etc. Any suitable criteria may be employed to create a pool of candidate grid locations for extension of the path. The flight path generation method involves selecting from these candidate flight path extensions to determine the next grid location in the flight path based on what produces the least cumulative noise and satisfies other relevant constraints (e.g., whether it is feasible/permissible for the aircraft to move through that path).

FIG. 6B reflects the result of the determination discussed with reference to FIG. 6A. Specifically, the assessment reflects the selection of waypoint grid location 602C as the extension of the flight path. Grid locations 602A and 602C are connected by a cell-to-cell segment 604, defining a portion of the overall flight path. The process is repeated at each established grid location—i.e., the next grid location that could be used to further establish the path are assessed in view of the predicted noise levels at the grid locations. FIG. 6C depicts a full calculated flight path 606 across the grid, in which a series of established grid locations define a flight path that reduces cumulative noise as compared to an alternate flight path through the geographic area.

In the above example, the grid-based selection of flight path extensions may be realized via application of a dynamic grid-based Viterbi algorithm. This may, for instance, model the flight path generation problem as an optimization problem that aims to find a flight path through the virtual grid that minimizes a cost, where cost corresponds to predicted noise. Using a Viterbi algorithm, each cell in the virtual grid can be thought of as a state the aircraft can occupy:

$$S=\{s_1, s_2, \ldots, s_K\} = \text{the state space}$$

The Viterbi algorithm works by evaluating the most likely sequence of these states (grid cells) based on a set of observations. These observations could include predicted noise levels at different grid locations, and/or factors such as weather conditions, airspace restrictions, etc.

$$Y=\{y_1, y_2, \ldots, y_T\} = \text{a sequence of observations}$$

A number of sequences of observations together collectively comprise the observation space $O=\{o_1, o_2, \ldots, o_N\}$, where $y_t=o_i$ if the observation at time t is $o_i$.

Probabilities are calculated representing the likelihood of transitioning from one state to another—e.g., reflecting the cost or likelihood of moving from one cell to another. This might factor in the distance between cells, fuel consumption for the transition, and/or the desirability of the path (e.g., avoiding populated areas to reduce noise impact):

$$\prod = \{\pi_1, \pi_2, \ldots, \pi_K\} = \text{initial probabilities}$$

The Viterbi algorithm may then compute a transition matrix A of size K*K, representing a transition from state $s_i$ to $s_j$, and compute an emission matrix B of size K*N, representing the likelihood of observing a state $o_j$ from a state $s_i$. Based on these computed values and matrices, the algorithm then iteratively generates a path that reduces cumulative noise along the chosen route by selecting a series of interconnected nodes (states) from start to end, based on the calculated probabilities. Specifically, the algorithm generates a path $X=\{x_1, x_2, \ldots, x_T\}$, which is a sequence of states $x_n \in S=\{s_1, s_2, \ldots, s_K\}$, where cumulative noise along the path is minimized or otherwise reduced.

In another example approach, the candidate flight path is generated as a sequence of waypoints connecting a starting waypoint to an ending waypoint within the geographic area, the sequence of waypoints selected via a weighted graph-based algorithm implemented by the flight path prediction system. Returning briefly to FIG. 3, the flight path prediction system implements an A* pathfinder algorithm 322 and a D* Lite algorithm 324, which may be used to generate a candidate flight path as will be described in more detail below. It will be understood that a flight path prediction system may use either or both of a grid-based approach and a weighted graph-based algorithm, and/or may use another suitable algorithm not explicitly described herein.

Figure 7A:
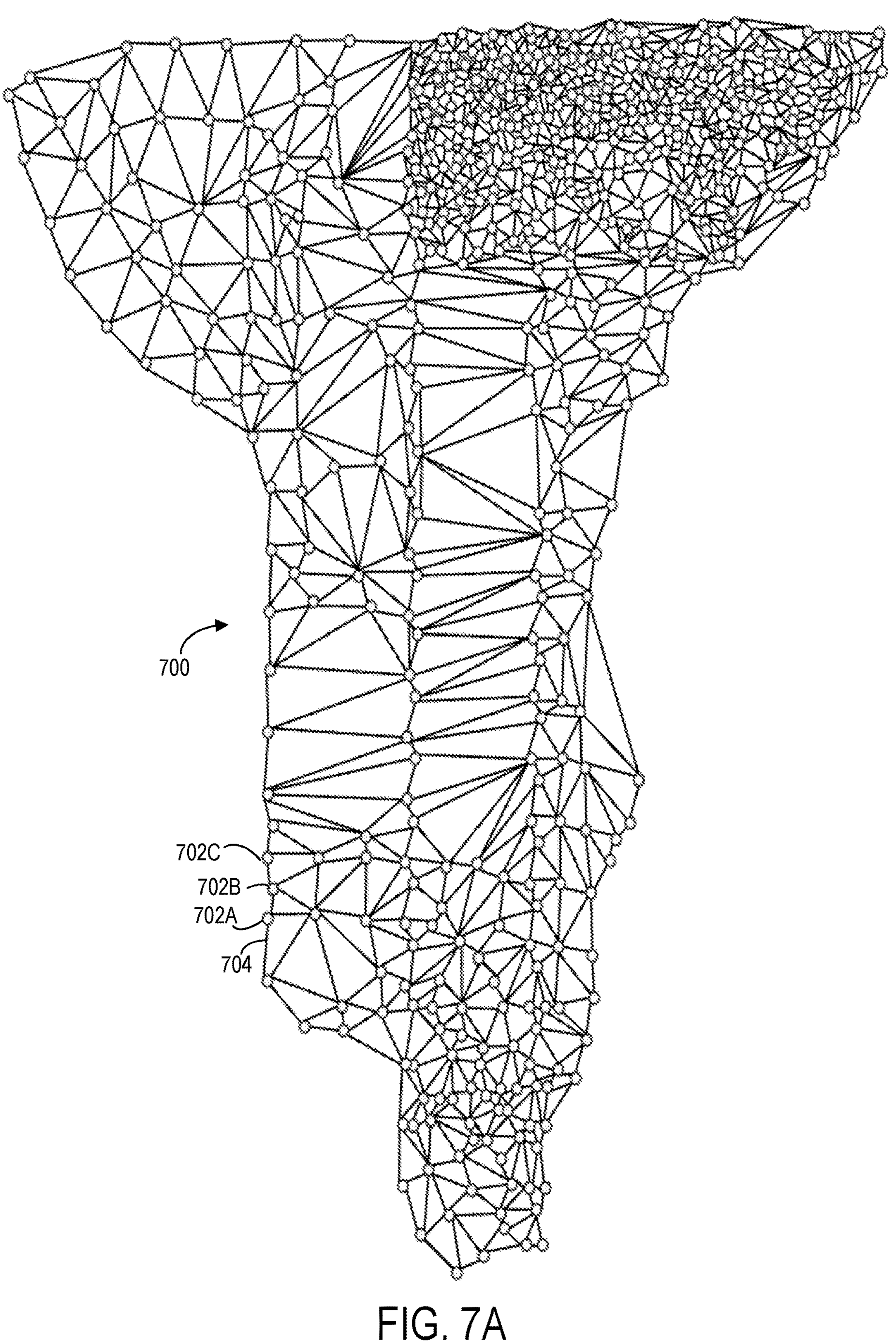
FIGS. 7A-C schematically depict generating a flight path as a sequence of waypoints selected via a weighted graph-based algorithm.
Figures 7B, 7C:
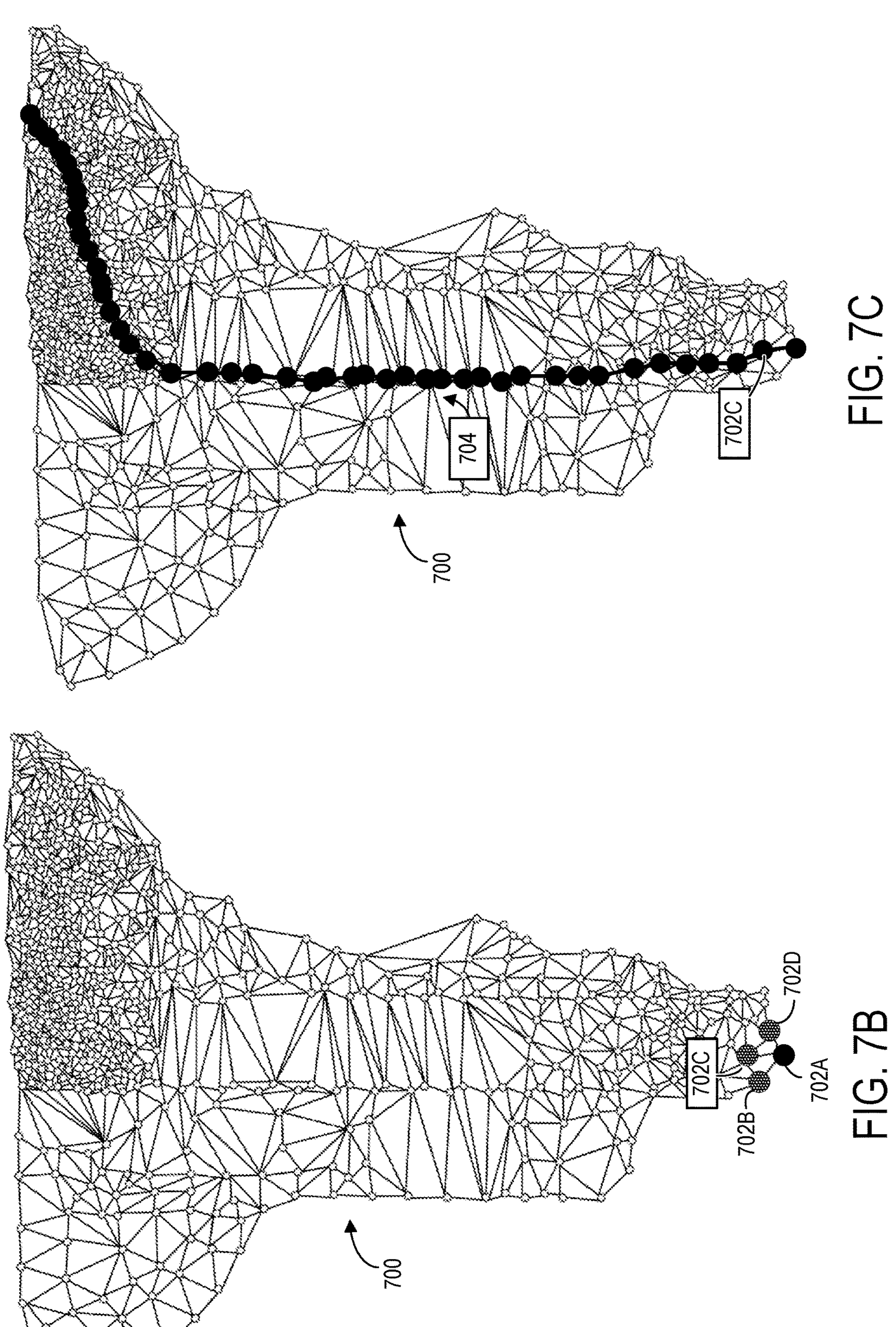

Use of a weighted graph approach is schematically illustrated with respect to FIGS. 7A-7C. FIG. 7A schematically shows a graph 700 including a plurality of example waypoint locations, which may be distributed across a geographic area as discussed above. Three of these waypoints are labeled as waypoints 702A-C. In this example, each waypoint and its predicted noise value are defined as nodes within the graph. Neighboring nodes are variously connected to one another via edges, such as edge 704, to account for the possibility that the associated waypoints could be passed through consecutively in a to-be-established flight path. This yields a directed acyclic graph (DAG).

In general, a weighted graph-based mechanism may be used to construct a series of waypoints into a flight path that optimizes cumulative aircraft noise. As in the prior example, predicted noise values for candidate waypoints are obtained, using the previously-referenced machine learning methods and/or any other practicable prediction method. As in the example of FIGS. 6A-C, the graph mechanism is used to start from an established position (a waypoint that has already been selected for the route) and extend the path selectively over multiple iterations to further waypoints based on constraints and cost (minimized noise) to achieve a desired route.

FIGS. 7B and 7C use graph 700 in a similar manner as described with reference to FIGS. 6A-C. Specifically, given an established waypoint that has been selected for a route, the route is further extended to neighboring waypoints using noise minimization mechanisms. In FIG. 7B, initial waypoint 702A has been established and the path-determining mechanism is used to select from a number of neighboring candidate waypoints 702B, 702C, and 702D which, together with initial waypoint 702A, could constitute a feasible flight path. In FIG. 7C, the iterative selection from neighbor candidates has yielded section of waypoint 702C to extend that flight path. This iterative selection from candidate neighbors is performed iteratively to yield a completed series of waypoints defining a flight path 704 as shown in FIG. 7C, similar to FIG. 6C.

A variety of graph approaches may be employed in connection with the example of FIGS. 7A-C. In general, each iteration involves taking the last established waypoint in a path, and determining to which waypoint the path should be extended, taking into account predicted noise for the candidate waypoints as a factor. One approach involves accounting for the path segment noise cost as well as an estimate of the cost required to extend the path to a state of completion (e.g., through the relevant airspace). A weighted A* search algorithm may be employed to determine path costs within graph 700, as one example, though any other suitable graph traversal or cost-calculating mechanism may be used to yield a series of waypoints that satisfy relevant constraints while reducing/optimizing cumulative noise for the associated flight path.

In some examples, the weighted graph-based algorithm further includes a D* Lite algorithm to account for dynamic updates to the plurality of route constraints. This allows for the dynamic updating of paths in response to new data, ensuring that the flight route remains optimized for noise minimization despite changing conditions. For instance, as discussed, route constraints affecting aircraft navigation (such as convective weather locations) may be dynamically updated as conditions change, and such dynamic updates may be input to the D* Lite algorithm while generating the candidate flight path.

In some cases, the grid-based Viterbi approach and weighted A* search algorithm may be used in different situations, and in some cases may be used together. It will be appreciated that the certainty associated with certain parameters of a flight will vary in relationship to when the aircraft will be flying over the region where noise will be experienced (e.g., vicinity of an airport). For example, as departure/arrival time approaches, the uncertainty of various parameter values (air traffic in the terminal area, convective weather, etc.) may increase, thus favoring a deterministic approach (i.e., the A* algorithm). Whereas, when uncertainty is higher (farther away from arrival/departure), a strategic and stochastic approach (i.e., Viterbi) can be used. Still further, since parameter uncertainty can range on a spectrum, both algorithms can run in parallel to optimize performance.

In any case, either or both of the grid-based or weighted graph-based approaches are used to generate a candidate flight path. Returning briefly to FIG. 2, at 206, method 200 includes the flight path prediction system outputting the candidate flight path. It will be understood that the candidate flight path may be "output" in any suitable way—e.g., the candidate flight path may be written to a file, stored in computer storage, transmitted to another computing device, displayed on a computer display, etc. In some examples, the flight path prediction system is configured to output multiple potential flight paths, which a human pilot may choose between depending on various considerations (e.g., predicted noise, total distance, fuel consumption, etc.). In some cases, the candidate flight path is output to an autonomous flight system, configured to fly the aircraft along the flight path without human intervention.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
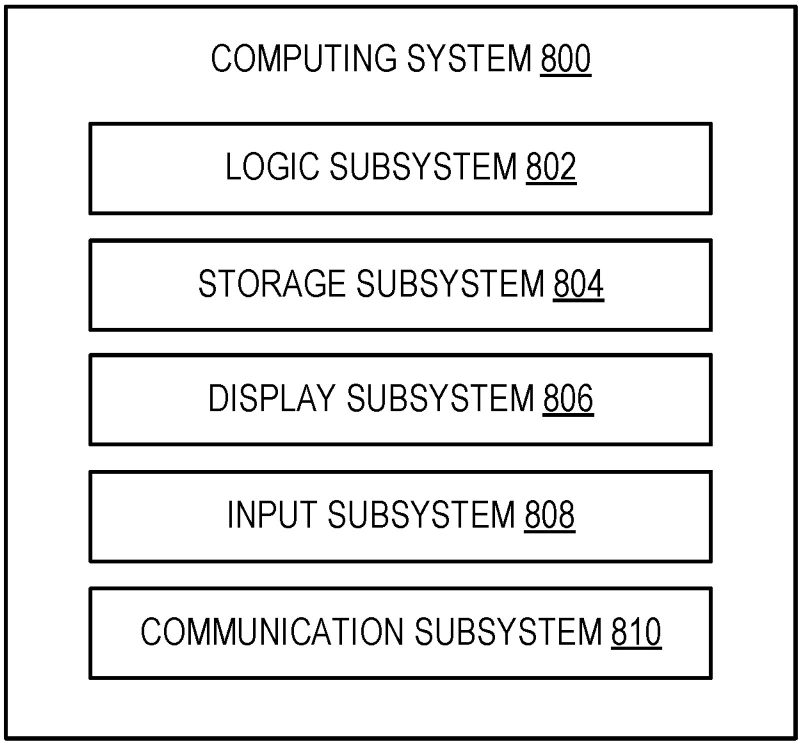
FIG. 8 schematically shows an example computing system.

FIG. 8 schematically shows a simplified representation of a computing system 800 configured to provide any to all of the compute functionality described herein. Computing system 800 may take the form of one or more network-accessible devices, personal computers, server computers, mobile computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information, such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

Further, the disclosure comprises configurations according to the following examples.

Example 1. A method for aircraft flight path generation, the method comprising: at a computing system, receiving, for a plurality of waypoints in a geographic area, predicted aircraft noise levels for an aircraft at each waypoint of the plurality of waypoints, the predicted aircraft noise levels predicted based at least in part on a plurality of flight parameters for the aircraft; inputting the predicted aircraft noise levels to a flight path prediction system configured to generate a candidate flight path for the aircraft through the geographic area based at least in part on the predicted aircraft noise levels; and outputting the candidate flight path from the flight path prediction system, wherein the candidate flight path is predicted to result in less ground-level noise when followed by the aircraft as compared to an alternate flight path through the geographic area.

Example 2. The method of example 1, wherein generating the candidate flight path includes overlaying a virtual grid on the geographic area such that, for a grid cell of the virtual grid, a grid-relative predicted noise level of the grid cell is interpolated from one or more predicted aircraft noise levels of one or more waypoints falling within the grid cell.

Example 3. The method of example 2, wherein the candidate flight path is generated as a plurality of cell-to-cell segments between grid cells of the virtual grid, wherein each cell-to-cell segment is selected based at least in part on grid-relative predicted noise levels of grid cells connected by the cell-to-cell segment.

Example 4. The method of example 3, wherein the flight path prediction system implements a dynamic grid-based Viterbi algorithm to generate the candidate flight path.

Example 5. The method of example 1, wherein the candidate flight path is generated as a sequence of waypoints connecting a starting waypoint to an ending waypoint within the geographic area, the sequence of waypoints selected via a weighted graph-based algorithm implemented by the flight path prediction system.

Example 6. The method of example 5, wherein the weighted graph-based algorithm includes an A* pathfinder algorithm.

Example 7. The method of example 6, wherein the weighted graph-based algorithm further includes a D* Lite algorithm to account for dynamic updates to a plurality of route constraints.

Example 8. The method of example 1, wherein the candidate flight path is predicted to cause an amount of ground-level noise at a ground location in the geographic area that is less than a predefined noise target.

Example 9. The method of example 1, wherein the candidate flight path is further generated based at least in part on a plurality of route constraints, and wherein the plurality of route constraints include one or more of a turning radius of the aircraft, coordinates of restricted airspace within the geographic area, weather conditions in the geographic area, and departure and arrival procedures applying to the geographic area.

Example 10. The method of example 1, wherein the predicted aircraft noise levels are predicted based at least in part on a plurality of historical measured noise levels for a plurality of prior aircraft flights through the geographic area.

Example 11. The method of example 10, wherein the predicted aircraft noise levels are predicted by a machine learning model trained based at least in part on the historical measured noise levels and historical flight parameters for the plurality of prior aircraft flights.

Example 12. The method of example 11, wherein the historical flight parameters include one or more of aircraft type, aircraft speed, altitude, time of day, and weather conditions for the plurality of prior aircraft flights.

Example 13. A computing system, comprising: a logic subsystem; and a storage subsystem holding instructions executable by the logic subsystem to: receive, for a plurality of waypoints in a geographic area, predicted aircraft noise levels for an aircraft at each waypoint of the plurality of waypoints, the predicted aircraft noise levels predicted based at least in part on a plurality of flight parameters for the aircraft; input the predicted aircraft noise levels to a flight path prediction system configured to generate a candidate flight path for the aircraft through the geographic area based at least in part on the predicted aircraft noise levels; and output the candidate flight path from the flight path prediction system, wherein the candidate flight path is predicted to result in less ground-level noise when followed by the aircraft as compared to an alternate flight path through the geographic area.

Example 14. The computing system of example 13, wherein generating the candidate flight path includes overlaying a virtual grid on the geographic area such that, for a grid cell of the virtual grid, a grid-relative predicted noise level of the grid cell is interpolated from one or more predicted aircraft noise levels of one or more waypoints falling within the grid cell.

Example 15. The computing system of example 14, wherein the candidate flight path is generated as a plurality of cell-to-cell segments between grid cells of the virtual grid, wherein each cell-to-cell segment is selected based at least in part on grid-relative predicted noise levels of grid cells connected by the cell-to-cell segment.

Example 16. The computing system of example 13, wherein the candidate flight path is generated as a sequence of waypoints connecting a starting waypoint to an ending waypoint within the geographic area, the sequence of waypoints selected via a weighted graph-based algorithm implemented by the flight path prediction system.

Example 17. The computing system of example 16, wherein the weighted graph-based algorithm includes an A* pathfinder algorithm.

Example 18. The computing system of example 13, wherein the candidate flight path is predicted to cause an amount of ground-level noise at a ground location in the geographic area that is less than a predefined noise target.

Example 19. The computing system of example 13, wherein the candidate flight path is further generated based at least in part on a plurality of route constraints, and wherein the plurality of route constraints include one or more of a turning radius of the aircraft, coordinates of restricted airspace within the geographic area, weather conditions in the geographic area, and departure and arrival procedures applying to the geographic area.

Example 20. A method for aircraft flight path generation, the method comprising: at a computing system, receiving, for a plurality of waypoints in a geographic area, predicted aircraft noise levels for an aircraft at each waypoint of the plurality of waypoints, the aircraft noise levels predicted based at least in part on a plurality of flight parameters for the aircraft, the predicted aircraft noise levels predicted by a machine learning model trained based at least in part on historical measured noise levels and historical flight parameters for a plurality of prior aircraft flights; inputting the predicted aircraft noise levels to a flight path prediction system configured to generate a candidate flight path for the aircraft through the geographic area based at least in part on the predicted aircraft noise levels and a plurality of route constraints; and outputting the candidate flight path from the flight path prediction system, wherein the candidate flight path is predicted to cause an amount of ground-level noise at a ground location in the geographic area that is less than a predefined noise target.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for aircraft flight path generation, the method comprising:

at a computing system, receiving, for a plurality of waypoints in a geographic area, predicted aircraft noise levels for an aircraft at the plurality of waypoints in which a predicted aircraft noise level for each waypoint is predicted based at least in part on a plurality of flight parameters for the aircraft passing through the waypoint;

inputting the predicted aircraft noise levels to a flight path prediction system configured to generate a candidate flight path for the aircraft through the geographic area based at least in part on the predicted aircraft noise levels, wherein the flight path prediction system generates the candidate flight path by:

calculating, for each grid cell of a plurality of grid cells of a virtual grid overlaid on the geographic area, a grid-relative predicted noise level, wherein, for at least one grid cell of the plurality of grid cells, the grid-relative predicted noise level is interpolated from two or more predicted aircraft noise levels of two or more of the plurality of waypoints falling within the grid cell;

selecting an initial grid cell of the plurality of grid cells as a starting point of the candidate flight path; and iteratively selecting one or more subsequent grid cells of the plurality of grid cells as extensions of the candidate flight path from the initial grid cell by, on each of one or more iterations:

identifying a set of candidate grid cells from among the plurality of grid cells, and selecting a next grid cell from among the set of candidate grid cells as an extension of the candidate flight path based on the grid-relative predicted noise levels of the set of candidate grid cells and further based on whether the set of candidate grid cells satisfy one or more route constraints; and outputting the candidate flight path generated by the flight path prediction system to a flight system configured to fly the aircraft along the candidate flight path.

2. The method of claim 1, wherein, for each grid cell of the virtual grid, the grid-relative predicted noise level of the grid cell is interpolated.

3. The method of claim 1, wherein the flight path prediction system implements a dynamic grid-based Viterbi algorithm to generate the candidate flight path.

4. The method of claim 1, further comprising generating a second candidate flight path using a weighted graph-based algorithm implemented by the flight path prediction system, wherein the second candidate flight path is generated as a sequence of waypoints connecting a starting waypoint to an ending waypoint within the geographic area.

5. The method of claim 4, wherein the weighted graph-based algorithm includes an A* pathfinder algorithm.

6. The method of claim 5, wherein the weighted graph-based algorithm further includes a D* Lite algorithm to account for dynamic updates to the one or more route constraints.

7. The method of claim 1, wherein the candidate flight path is predicted to cause an amount of ground-level noise at a ground location in the geographic area that is less than a predefined noise target.

8. The method of claim 1, wherein the one or more route constraints include one or more of a turning radius of the aircraft, coordinates of restricted airspace within the geographic area, weather conditions in the geographic area, and departure and arrival procedures applying to the geographic area.

9. The method of claim 1, wherein the predicted aircraft noise levels are predicted based at least in part on a plurality of historical measured noise levels for a plurality of prior aircraft flights through the geographic area.

10. The method of claim 9, wherein the predicted aircraft noise levels are predicted by a machine learning model trained based at least in part on the historical measured noise levels and historical flight parameters for the plurality of prior aircraft flights.

11. The method of claim 10, wherein the historical flight parameters include one or more of aircraft type, aircraft speed, altitude, time of day, and weather conditions for the plurality of prior aircraft flights.

12. A computing system, comprising:

a logic subsystem; and a storage subsystem holding instructions executable by the logic subsystem to:

receive, for a plurality of waypoints in a geographic area, predicted aircraft noise levels for an aircraft at the plurality of waypoints in which a predicted aircraft noise level for each waypoint is predicted based at least in part on a plurality of flight parameters for the aircraft passing through the waypoint;

input the predicted aircraft noise levels to a flight path prediction system configured to generate a candidate flight path for the aircraft through the geographic area based at least in part on the predicted aircraft noise levels, wherein the flight path prediction system generates the candidate flight path by:

calculating, for each grid cell of a plurality of grid cells of a virtual grid overlaid on the geographic area, a grid-relative predicted noise level, wherein, for at least one grid cell of the plurality of grid cells, the grid-relative predicted noise level is interpolated from two or more predicted aircraft noise levels of two or more of the plurality of waypoints falling within the grid cell;

selecting an initial grid cell of the plurality of grid cells as a starting point of the candidate flight path; and iteratively selecting one or more subsequent grid cells of the plurality of grid cells as extensions of the candidate flight path from the initial grid cell by, on each of one or more iterations:

identifying a set of candidate grid cells from among the plurality of grid cells, and selecting a next grid cell from among the set of candidate grid cells as an extension of the candidate flight path based on the grid-relative predicted noise levels of the set of candidate grid cells and further based on whether the set of candidate grid cells satisfy one or more route constraints; and output the candidate flight path generated by the flight path prediction system to a flight system configured to fly the aircraft along the candidate flight path.

13. The computing system of claim 12, wherein, for each grid cell of the virtual grid, the grid-relative predicted noise level of the grid cell is interpolated.

14. The computing system of claim 12, wherein the instructions are further executable to generate a second candidate flight path using a weighted graph-based algorithm implemented by the flight path prediction system, wherein the second candidate flight path is generated as a sequence of waypoints connecting a starting waypoint to an ending waypoint within the geographic area.

15. The computing system of claim 14, wherein the weighted graph-based algorithm includes an A* pathfinder algorithm.

16. The computing system of claim 12, wherein the candidate flight path is predicted to cause an amount of ground-level noise at a ground location in the geographic area that is less than a predefined noise target.

17. The computing system of claim 12, wherein the one or more route constraints include one or more of a turning radius of the aircraft, coordinates of restricted airspace within the geographic area, weather conditions in the geographic area, and departure and arrival procedures applying to the geographic area.

18. A method for aircraft flight path generation, the method comprising:

at a computing system, receiving, for a plurality of waypoints in a geographic area, predicted aircraft noise levels for an aircraft at the plurality of waypoints in which a predicted aircraft noise level for each waypoint is predicted based at least in part on a plurality of flight parameters for the aircraft passing through the waypoint, the predicted aircraft noise levels predicted by a machine learning model trained based at least in part on historical measured noise levels and historical flight parameters for a plurality of prior aircraft flights;

inputting the predicted aircraft noise levels to a flight path prediction system configured to generate a candidate flight path for the aircraft through the geographic area based at least in part on the predicted aircraft noise levels, wherein the flight path prediction system generates the candidate flight path by:

calculating, for each grid cell of a plurality of grid cells of a virtual grid overlaid on the geographic area, a grid-relative predicted noise level, wherein, for at least one grid cell of the plurality of grid cells, the grid-relative predicted noise level is interpolated from two or more predicted aircraft noise levels of two or more of the plurality of waypoints falling within the grid cell;

selecting an initial grid cell of the plurality of grid cells as a starting point of the candidate flight path; and iteratively selecting one or more subsequent grid cells of the plurality of grid cells as extensions of the candidate flight path from the initial grid cell by, on each of one or more iterations:

identifying a set of candidate grid cells from among the plurality of grid cells, and selecting a next grid cell from among the set of candidate grid cells as an extension of the candidate flight path based on the grid-relative predicted noise levels of the set of candidate grid cells and further based on whether the set of candidate grid cells satisfy one or more route constraints; and outputting the candidate flight path generated by the flight path prediction system to a flight system configured to fly the aircraft along the candidate flight path.

19. The method of claim 1, wherein the flight system is an autonomous flight system configured to fly the aircraft along the candidate flight path without human intervention.

20. The computing system of claim 12, wherein the flight system is an autonomous flight system configured to fly the aircraft along the candidate flight path without human intervention.

* * * * *